US009648233B2

(12) United States Patent
Beers et al.

(10) Patent No.: US 9,648,233 B2
(45) Date of Patent: May 9, 2017

(54) SYSTEM, DEVICE, AND VEHICLE FOR RECORDING PANORAMIC IMAGES

(71) Applicant: CycloMedia Technology B.V., Zaltbommel (NL)

(72) Inventors: Bart Johannes Beers, Rumpt (NL); Jose Herculano Lopes Barreto, 's-Gravendeel (NL)

(73) Assignee: CycloMedia Technology B.V., Zaltbommel (NL)

( * ) Notice: Subject to any disclaimer, the term of this patent is extended or adjusted under 35 U.S.C. 154(b) by 402 days.

(21) Appl. No.: 14/394,210

(22) PCT Filed: Apr. 12, 2013

(86) PCT No.: PCT/NL2013/050268
§ 371 (c)(1),
(2) Date: Oct. 13, 2014

(87) PCT Pub. No.: WO2013/154433
PCT Pub. Date: Oct. 17, 2013

(65) Prior Publication Data
US 2015/0077513 A1    Mar. 19, 2015

(30) Foreign Application Priority Data

Apr. 13, 2012   (NL) ..................................... 2008639

(51) Int. Cl.
*H04N 5/232*   (2006.01)
*G02B 27/10*   (2006.01)
(Continued)

(52) U.S. Cl.
CPC ..... *H04N 5/23238* (2013.01); *G02B 27/1066* (2013.01); *G02B 27/143* (2013.01); *G03B 17/17* (2013.01); *G03B 37/04* (2013.01)

(58) Field of Classification Search
CPC .................................................. H04N 5/23238
See application file for complete search history.

(56) References Cited

U.S. PATENT DOCUMENTS 3,740,469 A    6/1973   Herndon
7,899,270 B2 *  3/2011   Kim ...................... G06T 3/4038
                                                                348/97
(Continued)

FOREIGN PATENT DOCUMENTS

EP         0982946 A1      3/2000

OTHER PUBLICATIONS

International Search Report for PCT/NL2013/050268 dated Jul. 6, 2013.
(Continued)

*Primary Examiner* — Jay Patel
*Assistant Examiner* — Irfan Habib
(74) *Attorney, Agent, or Firm* — McDonnell Boehnen Hulbert & Berghoff LLP

(57) ABSTRACT

The present invention relates to a system, a device, and vehicle for recording panoramic images. According to the present invention, panoramic images can be obtained using a plurality of optical cameras and light directing elements which are arranged based on a parabola. This allows a compact device to be obtained while ensuring that each camera records a partial image as if it were at substantially the same focus point as the other cameras. By arranging the plurality of cameras and light directing elements such that the respective focus points are slightly offset relative to each other, a slight overlap between adjacent field of views can be obtained to improve stitching of the partial images to from the panoramic image.

19 Claims, 12 Drawing Sheets

(51) Int. Cl.
*G02B 27/14* (2006.01)
*G03B 37/04* (2006.01)
*G03B 17/17* (2006.01)

(56) References Cited

U.S. PATENT DOCUMENTS

| | | | | |
|---|---|---|---|---|
| 8,013,899 B2* | 9/2011 | Gillard | ............... | G03B 37/04 |
| | | | | 348/157 |
| 8,150,124 B2* | 4/2012 | Wang | ............... | A61B 1/0005 |
| | | | | 382/128 |
| 8,305,425 B2* | 11/2012 | Len | ............... | G02B 13/06 |
| | | | | 348/36 |
| 8,355,042 B2* | 1/2013 | Lablans | ............... | G03B 37/00 |
| | | | | 348/36 |
| 8,416,282 B2* | 4/2013 | Lablans | ............... | G03B 5/00 |
| | | | | 348/36 |
| 9,071,751 B2* | 6/2015 | Higashimoto | ..... | H04N 5/23238 |
| 9,118,905 B2* | 8/2015 | Gallup | ............... | H04N 13/0282 |
| 9,185,391 B1* | 11/2015 | Prechtl | ............... | H04N 5/3415 |
| 9,250,510 B2* | 2/2016 | Li | ............... | G03B 37/06 |
| 9,270,885 B2* | 2/2016 | Rapoport | ............... | H04N 1/00183 |
| 9,277,122 B1* | 3/2016 | Imura | ............... | H04N 5/23238 |
| 9,307,165 B2* | 4/2016 | Levy | ............... | G06K 9/20 |
| 9,516,208 B2* | 12/2016 | Dortch | ............... | H04N 5/33 |

| | | | | |
|---|---|---|---|---|
| 2002/0089765 A1 | 7/2002 | Nalwa | | |
| 2003/0214575 A1 | 11/2003 | Yoshikawa | | |
| 2006/0062487 A1* | 3/2006 | Ouchi | ............... | G06T 3/4038 |
| | | | | 382/284 |
| 2007/0122058 A1* | 5/2007 | Kitaura | ............... | G06T 7/0071 |
| | | | | 382/284 |
| 2008/0252717 A1* | 10/2008 | Moon | ............... | G03B 37/04 |
| | | | | 348/36 |
| 2008/0298674 A1* | 12/2008 | Baker | ............... | G06K 9/209 |
| | | | | 382/154 |
| 2009/0022422 A1* | 1/2009 | Sorek | ............... | G06T 3/4038 |
| | | | | 382/284 |
| 2010/0134621 A1* | 6/2010 | Namkoong | ............... | G02B 13/06 |
| | | | | 348/143 |
| 2011/0193941 A1* | 8/2011 | Inaba | ............... | G03B 35/14 |
| | | | | 348/46 |
| 2012/0189167 A1* | 7/2012 | Kurata | ............... | H04N 5/145 |
| | | | | 382/107 |

OTHER PUBLICATIONS

"Parabola", Mar. 22, 2012, pp. 1-12, XP055044005, retrieved from the internet: URL:http://en.wikipedia.org/w/index.php?title=Parabola&oldid=483301048 [retrieved on Nov. 13, 2012].

* cited by examiner

SYSTEM, DEVICE, AND VEHICLE FOR RECORDING PANORAMIC IMAGES

CROSS-REFERENCE TO RELATED APPLICATIONS

This application is a U.S. national stage application of International Application Serial No. PCT/NL2013/050268 filed Apr. 12, 2013, which claims priority to Netherlands Application No. 2008639 filed on Apr. 13, 2012, the contents of each application are hereby incorporated by reference.

BACKGROUND

The present invention relates to a system, a device, and vehicle for recording panoramic images.

A panoramic image is an image with an elongated field of view (FOV). Normally, an optical camera records an image with a limited field of view as defined by the photosensitive component and lens system of the camera. In order to obtain a image of a wider format, one has to use different additional lenses, such as a fisheye lens, or one has to combine multiple images to provide the impression of one large image. The latter process requires stitching of the images. Normally, the multiple images have a slight overlap in their field of view such that an interpolation process can be used to determine the image properties in the overlapping region.

A drawback of combining multiple images is that it is prone to parallax errors. These errors originate from the fact that the multiple images are not recorded from the same position. A solution to this problem is to use rotatable cameras which are mounted on a stand. By making sure that the entrance pupil of the camera remains substantially at the same position, albeit rotated, one can reduce parallax errors to an acceptable degree.

Using a single camera to record a plurality of images that are later combined into a single panoramic image limits the applicability of the technique to the recording of static environments only. Moreover, such technique is not suitable for recording movies as this would require the camera to rotate at impractical speeds. Moreover, such system is not suitable for applications in which the camera itself is moving. Examples of such applications are the recording of panoramic images for navigational systems or derivatives thereof such as Google Street View.

A solution to this problem has been disclosed in U.S. 2002/0089765 A1. The system described therein uses a reflective pyramid in which the reflective sidewalls are under a 45° angle with respect to the base of the pyramid. Cameras are positioned relative to each of the sidewalls such that each camera appears to record an image from a virtual reference point inside the pyramid. In other words, the images recorded by these cameras are identical to the images that would have been recorded by a virtual optical camera positioned at the reference point. Here, reference point corresponds to the position of the entrance pupil of the virtual camera. Using a pyramid with four sidewalls therefore results in four images from four different orientations which can later on be combined into one panoramic image. Moreover, the images making up the larger panoramic image, the so called partial images, appear to have been recorded at substantially the same position of the entrance pupil, thereby reducing or eliminating parallax errors.

A recent trend or desire is to obtain panoramic images with very high resolution, for instance for making detailed measurements in those images. Furthermore, to be able to derive useful information from these images, they need to be metrically correct. These desires can only be partially met by the abovementioned system. Given an optical camera with a predefined resolution one can increase the resolution of the panoramic image by increasing the number of cameras used. This allows a camera to use its full resolution for a relatively small field of view.

A solution to this problem is presented in EP 0 982 946 A1. This system resembles that of U.S. 2002/0089765 A1 with the exception that it describes how different pyramids may be stacked in the vertical direction.

A drawback of the abovementioned system is that it is difficult to stitch the various partial images that are capture by the cameras. To ensure proper stitching, an overlapping region in adjacent partial images is preferred. By using cameras with overlapping FOVs, as disclosed in EP 0 982 946 A1, such overlap can be realized. Unfortunately, the regions of overlap correspond to physical boundaries of the system, such as edges of mirrors or lenses. These boundaries introduce unwanted deformations in the partial images, thereby deteriorating the stitching process.

SUMMARY

It is therefore an object of the present invention to provide a solution to the abovementioned problem such that high resolution parallax error free panoramic images can be recorded.

According to a first aspect of the invention, this object is at least partially achieved with a system for recording panoramic images as defined in claim 1.

The system of the present invention comprises a device for recording panoramic images, wherein the panoramic images are formed using a plurality of partial images. The device comprises a frame and a plurality of optical pairs, each optical pair comprising a light directing element and an optical camera having an entrance pupil. The light directing element of each optical pair is arranged at a point on a respective parabola, perpendicular to a tangent thereof. The respective parabola has an axis of symmetry and a focus point. The axis of symmetry runs through the vertex and focus point of the parabola.

The light directing element and optical camera of each optical pair are connected to the housing in such a manner that the optical camera records an image obtained via the light directing element as if it were positioned with its entrance pupil at the respective focus point. Hence, each optical pair is assigned a respective focus point and the optical camera appears to have its entrance pupil positioned at the respective focus point.

Each optical pair defines a field of view (FOV) representing a segment of an environment of the device from which light can be captured via directing thereof by the light directing element onto an entrance pupil of the respective optical camera.

The respective focus points of the plurality of optical pairs substantially overlap each other. This allows a parallax error free or error reduced panoramic image. The wording substantially is used here because for some embodiments a slight offset between focus points is desired as will be described later.

The axes of symmetry of the respective parabolas of at least two optical pairs of the plurality of optical pairs are substantially parallel. FOVs defined by these at least two optical pairs are adjacent in a direction parallel to the substantially parallel axes of symmetry.

For instance, if the axes of symmetry extend along a vertical direction, the FOVs defined by the at least two optical pairs are arranged one above the other. The FOVs defined by the at least two optical pairs can be arranged in a stacked manner in the direction parallel to the substantially parallel axes of symmetry.

Alternatively or additionally, the FOVs defined by the at least two optical pairs can overlap in the direction parallel to the substantially parallel axes of symmetry for forming an overlapping region in the form of a ribbon that extends in a circumferential direction with respect to the substantially parallel axes of symmetry. The ribbon generally has a curved shape but is not restricted thereto. The ribbon facilitates the stitching process as will be elucidated later on.

The positioning of the light directing elements is determined by the mathematical concept of a parabola. Because the relevant optical camera is positioned such that it appears to be recording images at the corresponding focus point, its position is also determined by the parabola, albeit indirectly. The respective focus points of optical pairs corresponding to adjacent FOVs are preferably slightly offset relative to each other for allowing a slight overlap between the adjacent FOVs to improve stitching of the plurality of partial images into the panoramic image. The skilled person is aware of various techniques with which the information from overlapping FOVs can be used to obtain a reduced or error free transition between the partial images. This technique is particularly useful for reducing artifacts caused by the mechanical construction of the device. For instance, some parts of the frame may block incident light. Mostly, these elements cause disturbances near the edges of the FOV. Similarly, imperfections in the light direction elements, for instance at the edges thereof, may be a further cause for artifacts.

The parabola has the attracting feature that light incident parallel to the axis of symmetry are directed towards the focus point of the parabola. Consequently, the optical axis of every camera for which the corresponding light directing element is placed on the same parabola is parallel to the axis of symmetry. This allows for a very compact configuration as most cameras are elongated along their optical axes. Aligning these axes allows the cameras to be placed in close proximity to each other.

The system according to the invention further comprises a controller to individually and independently trigger each optical camera to record a partial image. A motion calculator is employed to calculate a distance travelled by the system in a movement direction. A processing unit to calculate a timing difference between optical cameras based on the relative offset of their focus points in the direction of movement.

The controller is arranged to trigger the optical cameras using the calculated timing difference in a manner such that the optical cameras record partial images as if their entrance pupils were at substantially the same position in the direction of movement at the time of recording the partial image. For instance, if two optical cameras are used of which, in a direction of movement, the corresponding focus points are separated by a distance D, the triggering of the camera in the rear will trail the triggering of the camera in the front by D/v seconds, wherein v represents the velocity of the system. This ensures that the camera in the rear records an image at the same position with reference to the environment as the camera in front.

The present invention provides an improved stitching process whereby the deteriorating effects of physical boundaries in the optical system are alleviated by a combination of an intentional shift of the focus points of the cameras from their ideal position and a suitable triggering to compensate for the parallax errors introduced by the intentional shift.

At least the device for recording panoramic images may be mounted on a moveable vehicle, wherein the respective focus points of the plurality of optical pairs are positioned along a substantially straight line that corresponds to a default direction of movement of said moveable vehicle. In this manner, parallax errors can be removed substantially entirely. Other components of the system for recording panoramic images may also be mounted on the vehicle. Alternatively, parts of the system are mounted on the vehicle while other parts are not. Wireless technology may be used for communication between the different parts of the system. In a preferred embodiment, the system is entirely mounted on the vehicle.

If the device is moving along the straight line and the individual cameras are properly triggered, it can be achieved that at the time of recording an image, the virtual entrance pupils of the respective cameras, i.e. the respective focus points, are at the same position.

It is also advantageous if the optical axes of the optical cameras of said at least two optical pairs are substantially parallel. Preferably, the parabolas of the at least two optical pairs are substantially overlapping.

Herein, the wording substantially is used to indicate that small deviations with respect to the ideal mathematical shape of a parabola are not excluded from the scope of the present invention. For instance, the skilled person will appreciate that by not placing the light directing element exactly at a point on the parabola, the optical axis of the optical camera will not be exactly parallel to the axis of symmetry. Moreover, for some applications, small deviations will be acceptable or desirable.

The axes of symmetry of the respective parabolas are preferably substantially parallel to a common axis of symmetry. It is further advantageous if the curvature of the parabolas is substantially equal whereby the plurality of respective parabolas substantially defines a paraboloid.

It is further advantageous if the device has a conical or pyramid shape and/or is elongated in the direction of the common axis of symmetry. In addition, in some embodiments it is possible to divide the plurality of optical pairs into at least two groups, wherein each group is arranged for recording a circumferential ribbon of adjacent partial images around a longitudinal axis of the conical or pyramid shape, or the common axis of symmetry, albeit at a different longitudinal position.

The skilled person will understand that, given the fact that a slight offset must exist for the focus points to improve the stitching process, the combination of parabolas will not amount to a perfect mathematical ideal paraboloid.

In addition, it is advantageous if the light direction elements of each optical pair in the same group have substantially the same longitudinal position and if the optical cameras of each optical pair in the same group have substantially the same longitudinal position.

The previous embodiments, in which a light directing element was used in combination with an optical camera, can be combined with an optical camera arranged substantially at one of the focus points. Preferably, this optical camera has an optical axis substantially parallel to one of the axis of symmetry of a previously mentioned parabola. When this camera is combined with the configuration of the groups of cameras, a device is obtained with which a semi-sphere or similar shape around the device can be captured at high resolution.

For each optical pair the distance between the respective focus point and the corresponding point on the parabola is preferably equal to the distance between the corresponding point and the entrance pupil of the respective optical camera. This ensures that the optical camera operates as a virtual camera with its entrance pupil at the respective focus point. Here, the optical axis of the virtual camera crosses the corresponding point on the parabola.

The light direction element could for instance be an optical reflective element, such as a mirror, or a combination of mirrors. In a further embodiment, each of a plurality of the optical pairs comprise a mirror that is part of an integrally formed curved mirror. Hence, instead of a plurality of discrete mirrors, a single integrally formed mirror can be used. Such mirror would reduce the artifacts normally attributed with the edges of the mirrors. When different groups of optical pairs are used, it is advantageous if the mirrors of each group are part of a respective integrally formed curved mirror.

Instead of or in addition to the reflective element, the light direction element could be a refractive element, such as a prism or a ray bender.

The skilled person is aware of various technologies in which to implement the various components of the present invention. Here, the wording optical camera is used to indicate any element, device or system that is capable of recording an optical image by using a light sensitive component such as a charge coupled device (CCD) or light sensitive film.

Due to the compact nature of the device according to the present invention, it becomes feasible to realize at least one of the light direction elements and/or optical cameras in Micro Electro Mechanical Systems (MEMS) technology.

According to second and third aspect, the present invention also provides a moveable vehicle and a device for recording panoramic images as defined in claims 17 and 18, respectively. In a preferred embodiment, the moveable vehicle is a motorized vehicle, such as a car.

DESCRIPTION OF THE DRAWINGS

Next, the invention will be described in more detail using the appended figures, in which.

DETAILED DESCRIPTION

Figure 1:
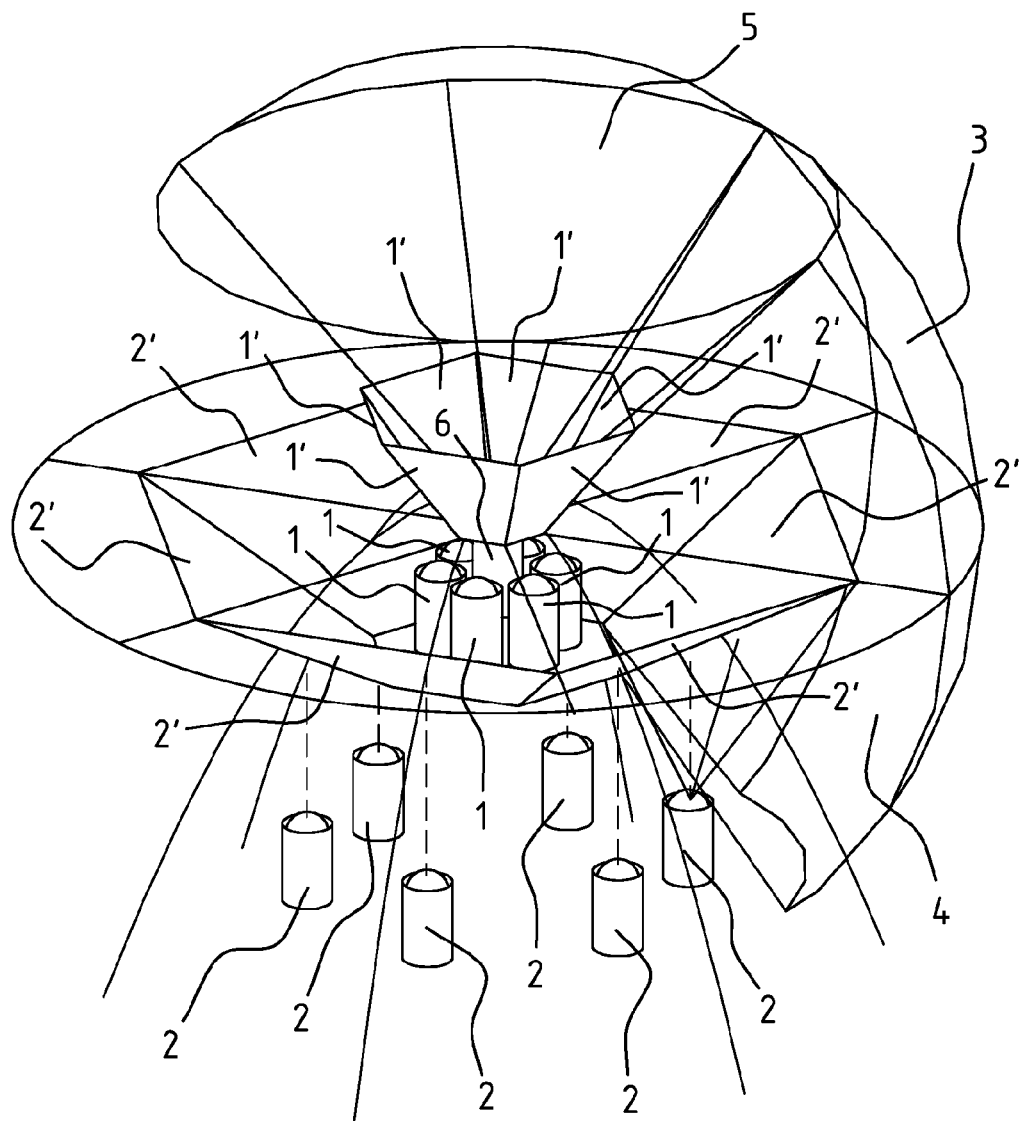
FIG. 1 illustrates an embodiment of a device for recording panoramic images according to the present invention.

FIG. 1 illustrates an embodiment of a device for recording panoramic images according to the present invention. This embodiment comprises 2 groups of optical pairs. The first group comprises six optical cameras 1 and six associated optical mirrors 1'. Similarly, the second group comprises six optical cameras 2 and six associated optical mirrors 2'. In FIG. 1, a separate optical camera 6 is arranged in between optical mirrors 1'.

The field of view (FOV) indicates a segment of an environment of the device from which light can be captured via directing thereof by the optical mirrors 1', 2' onto an entrance pupil of the optical cameras 1, 2. For instance, segments 3 and 4 represent the FOV corresponding to one of the optical cameras of the first and second group, respectively. Segment 5 corresponds to the optical camera that is arranged within optical mirrors 1'. Light incident on this camera is not reflected by an optical mirror.

It is clear from FIG. 1 that each optical camera 1, 2 captures only a relatively small segment of the environment of the device. Hence, such segment is photographed using a relatively high resolution. This allows a high resolution panoramic image to be obtained.

Figure 2:
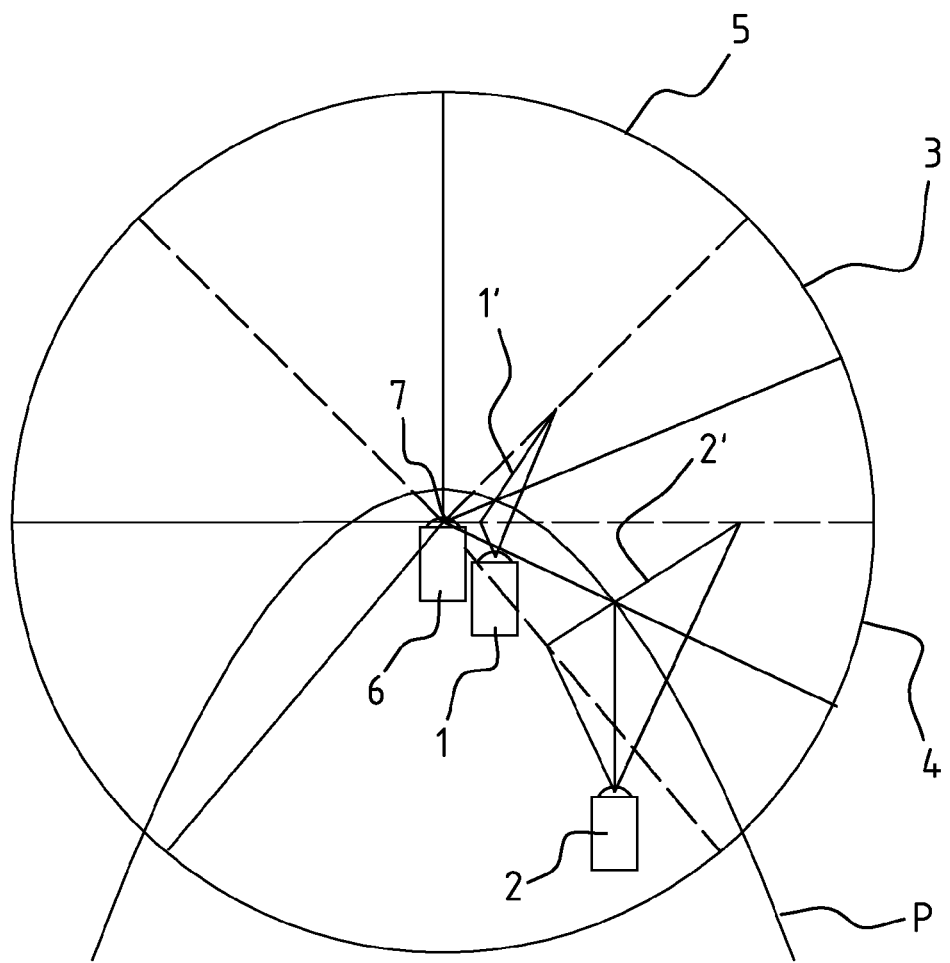
FIG. 2 depicts a schematic side view of the embodiment in FIG. 1.

FIG. 2 depicts a schematic side view of the embodiment in FIG. 1. Here, only a single optical camera 1, 2 per group is illustrated. Moreover, mirrors 1', 2' are indicated by a straight line. The dotted lines indicate a two-dimensional representation of the FOV that corresponds to each optical camera 1, 2, and 6.

In FIG. 2, a parabola P is illustrated according to which optical mirrors 1', 2' are placed. Moreover, a single optical camera 6, corresponding to segment 5, is placed with its entrance pupil at the focus point of parabola P.

Next, the arrangement of optical cameras 1, 2 and optical mirrors 1', 2' is explained using FIGS. 3A-3E. Here, FIGS. 4A-4C present a three-dimensional representation of the segments covered by the optical cameras described in conjunction with FIGS. 3A-3E.

Figure 3A:
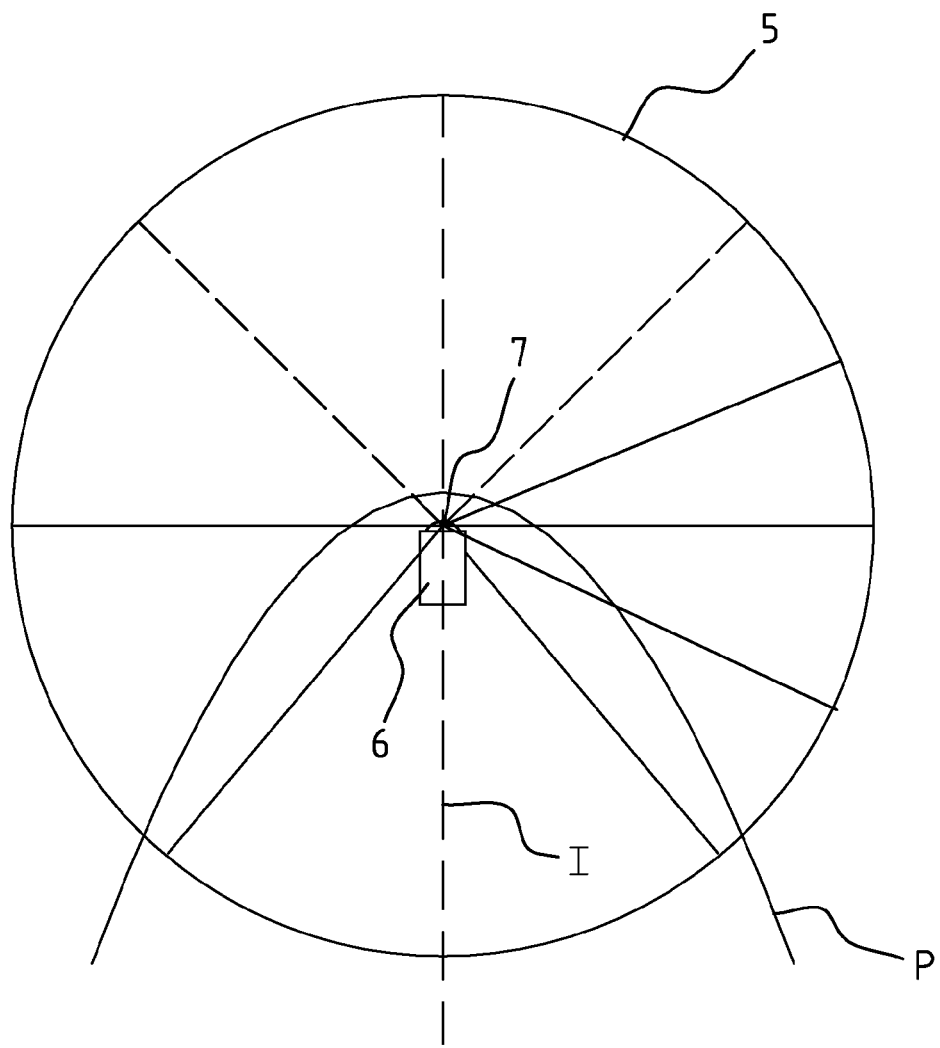
FIGS. 3A-3E explain the arrangement of the optical mirrors and cameras of the embodiment in FIG. 1.
Figure 4A:
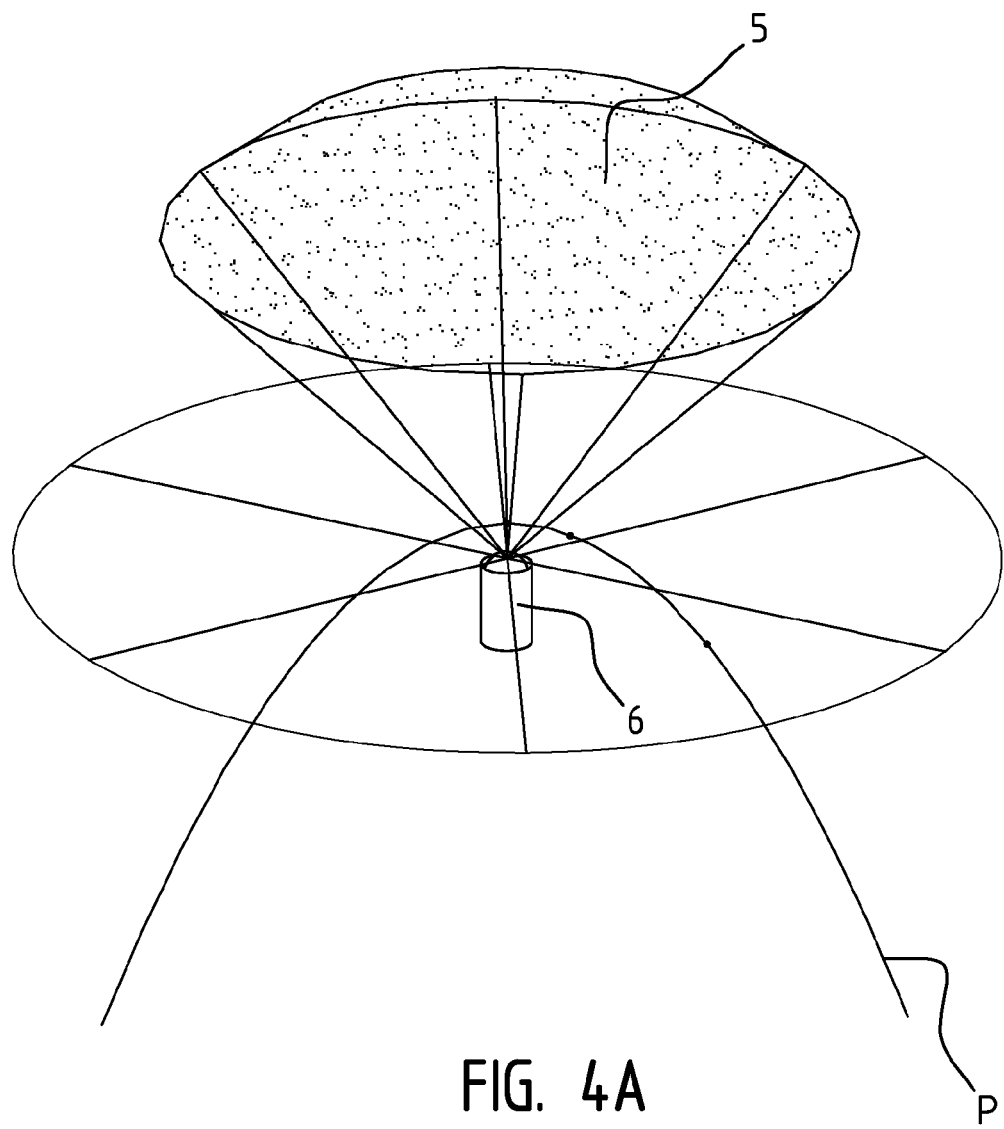
FIGS. 4A-4C present a three-dimensional representation of the segments covered by the optical cameras described in conjunction with FIGS. 3A-3E.
Figure 4B:
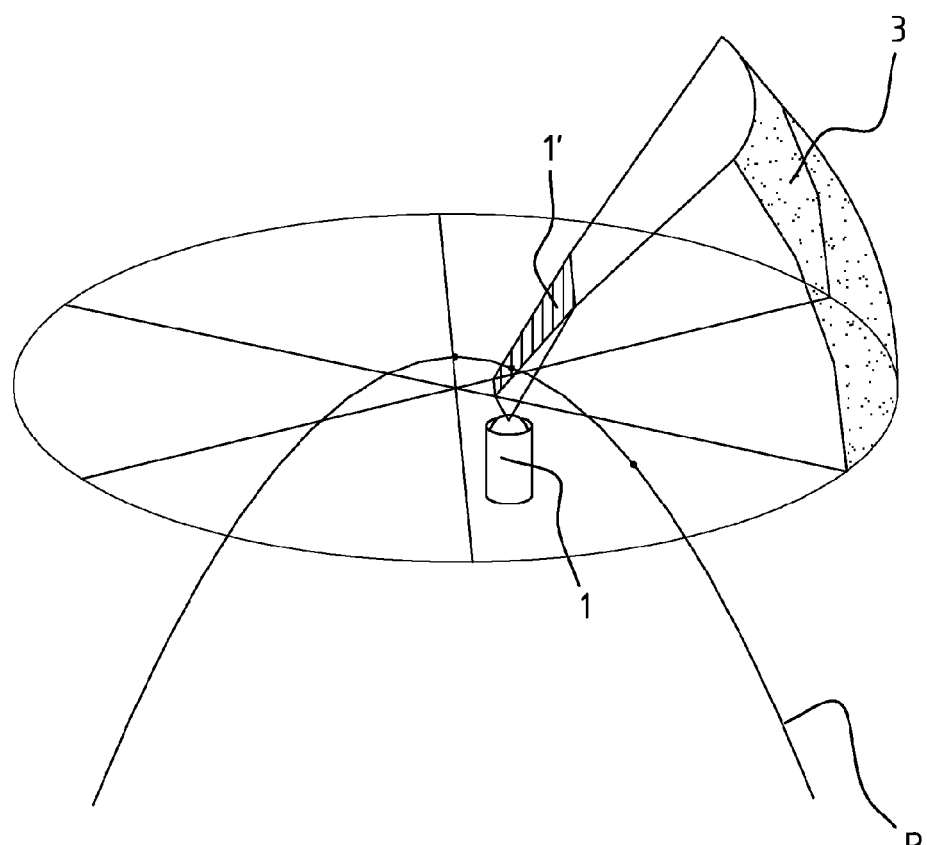
Figure 4C:
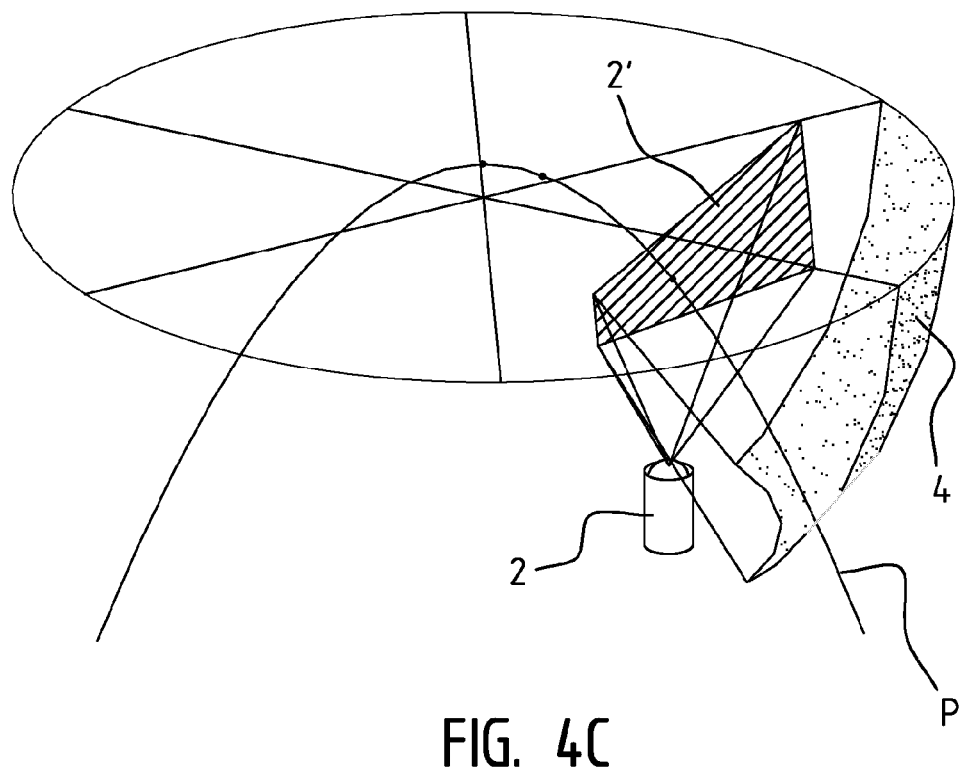

Firstly, FIG. 3A shows that single optical camera 6 is arranged with its entrance pupil at focus point 7 of parabola P. Also illustrated in FIG. 3A is axis of symmetry I for parabola P, which coincides with the optical axis of optical camera 6.

Figure 3B:
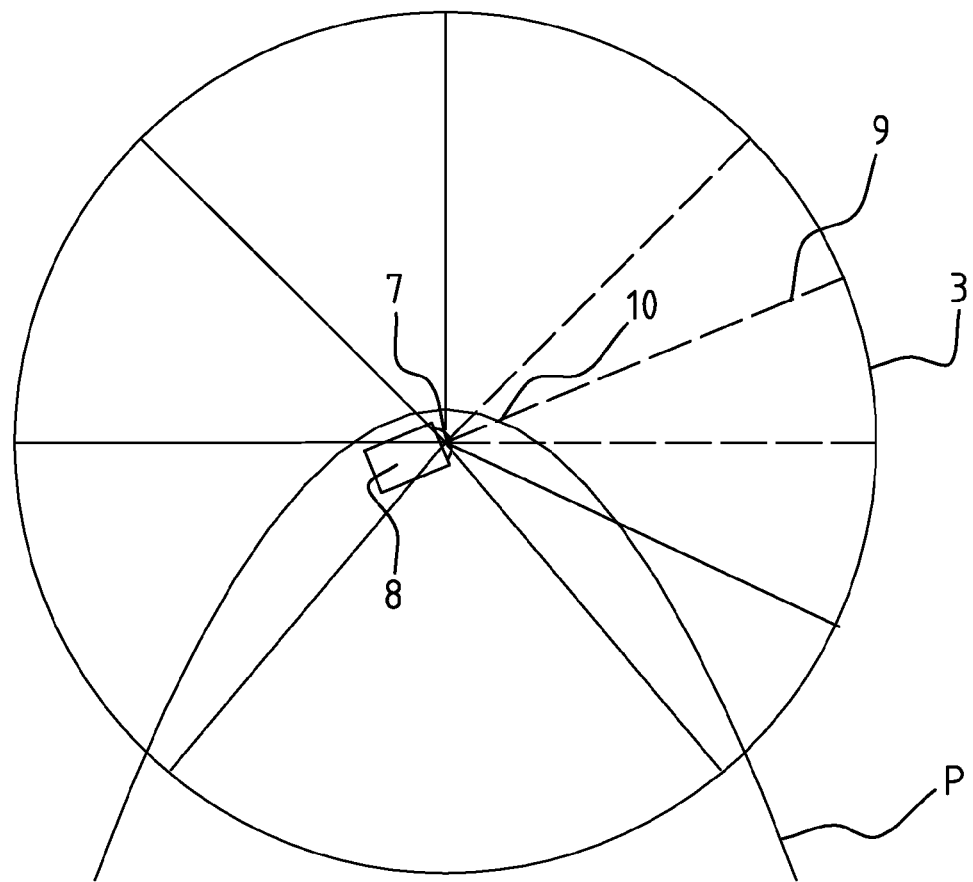

FIG. 3B shows the orientation of a virtual camera 8, having its entrance pupil at focus point 7, which would allow segment 3 to be captured. Here, point 10 illustrates where optical axis 9 intersects parabola P.

Figure 3C:
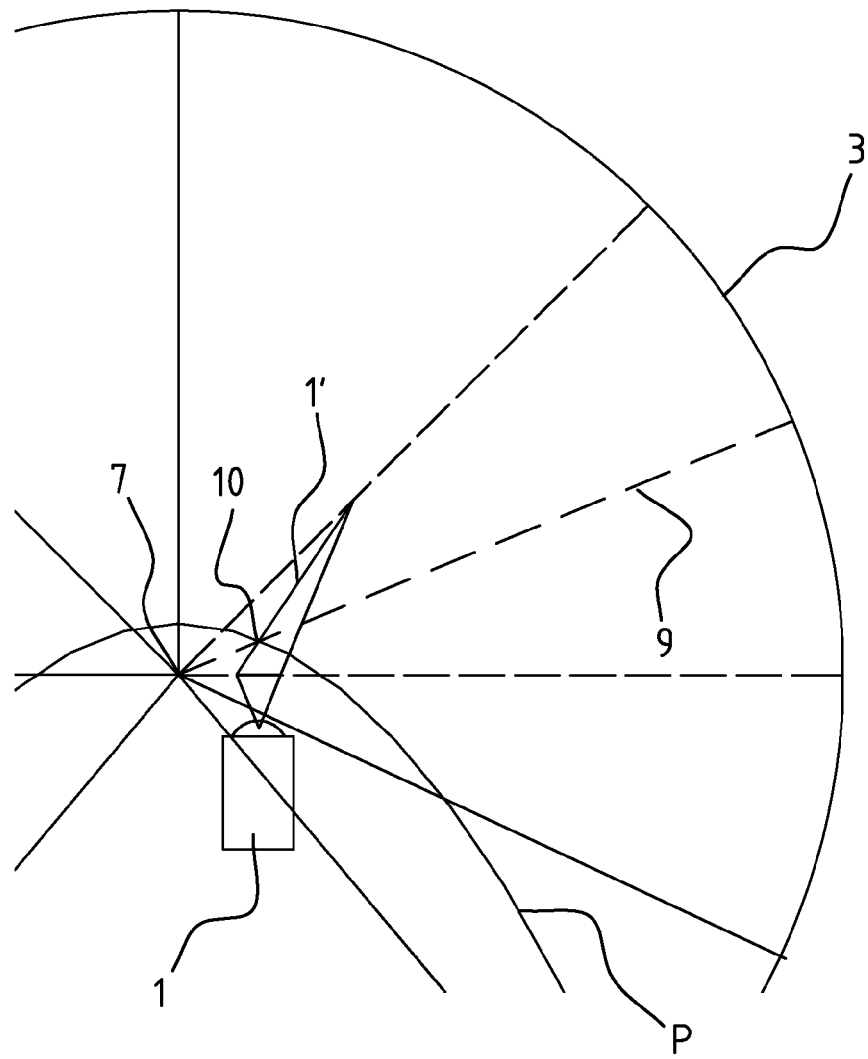

FIG. 3C illustrates optical camera 1 which is arranged such that the distance between the entrance pupil of optical camera 1 and point 10 equals the distance between point 10 and focus point 7. The orientation of optical mirror 1' is such that segment 3 is covered. Moreover, actual optical camera 1 and virtual camera 8 are each other mirror images with respect to optical mirror 1'. Consequently, the light captured by optical camera 1 equals that which would have been captured by virtual camera 8. Moreover, the apparent position of the entrance pupil of optical camera 1 is focus point 7. Hence, images taken by optical cameras 1 and 6 appear to have been taken from the same point, i.e. focus point 7. At this point, it should be noted that in this explanation, the offset between the various focus points is not included. This will be elucidated with reference to FIGS. 5A and 5B.

Figure 3D:
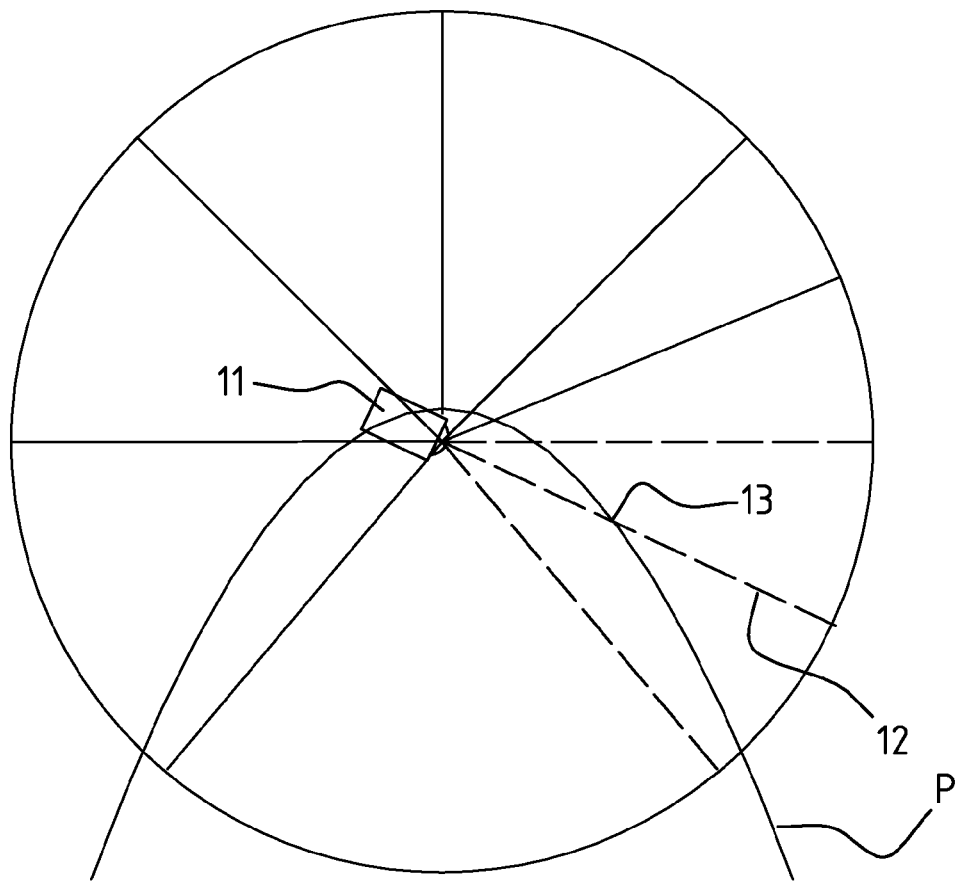
Figure 3E:
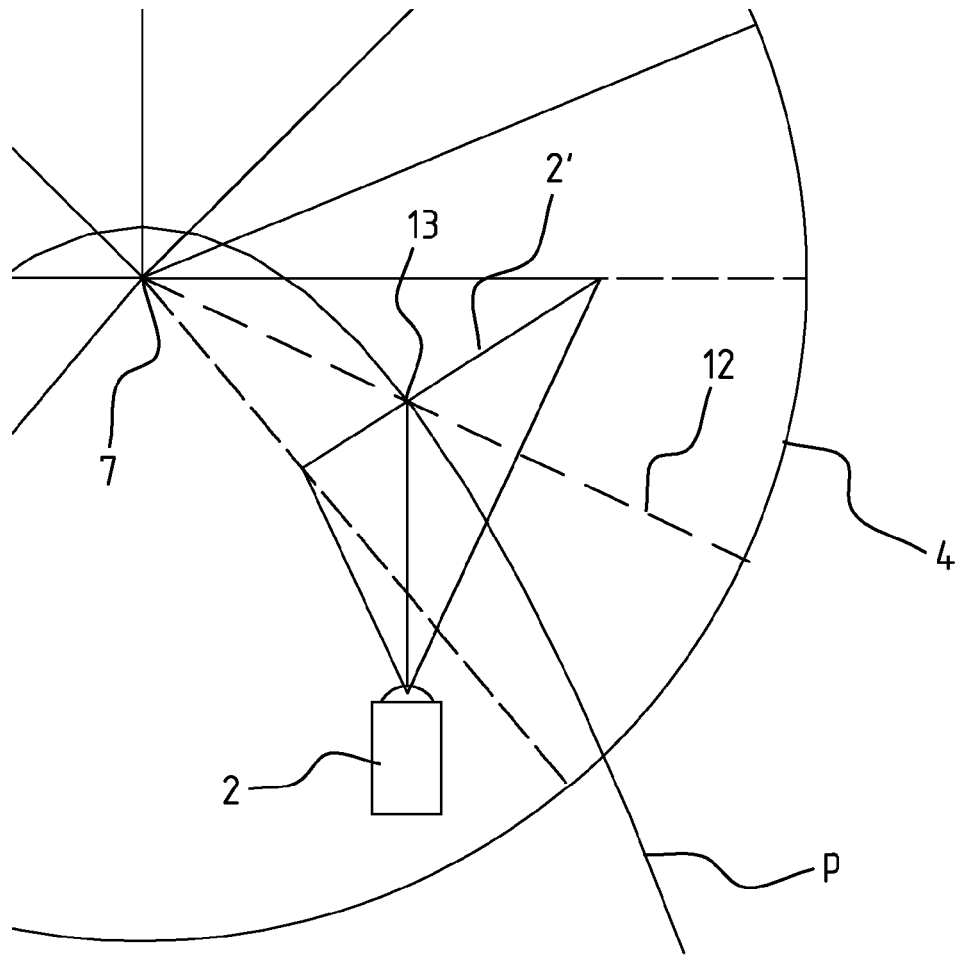

FIG. 3D illustrates a virtual optical camera 11 that is positioned to cover segment 4. Optical axis 12 of camera 11 intersects parabola P at point 13. FIG. 3E shows the arrangement of actual optical camera 2 and optical mirror 2'. Again the distance between the entrance pupil of optical camera 2 and point 13 equals that of the distance between point 13 and focus point 7. The orientation of optical mirror 2' is such that segment 4 is covered. Optical camera 2 and virtual optical camera 11 are each other mirror images with respect to optical mirror 2'.

Optical cameras 1, 2 both have their optical axis parallel to axis of symmetry I depicted in FIG. 3A. Also, referring back to FIG. 1, it is apparent that every optical camera has its optical axis parallel to axis of symmetry. This also allows a close stacking of optical cameras. Furthermore, the focus points corresponding to the various parabolas used for arranging the optical cameras and optical mirrors in correspondence with the method disclosed in FIGS. 3A-3E are substantially overlapping. In reality a small offset must be employed to improve the stitching process as will be described later on.

The respective parabolas corresponding to the optical pairs in FIG. 1 define a paraboloid having a single focus point that corresponds substantially to the focus points of the individual parabolas. Although preferred, the present invention does not exclude the possibility that different parabolas are used for different optical pairs. For instance, one optical pair could be placed in accordance with a parabola having a larger curvature than other optical pairs, albeit having substantially the same focus point.

Figure 5A:
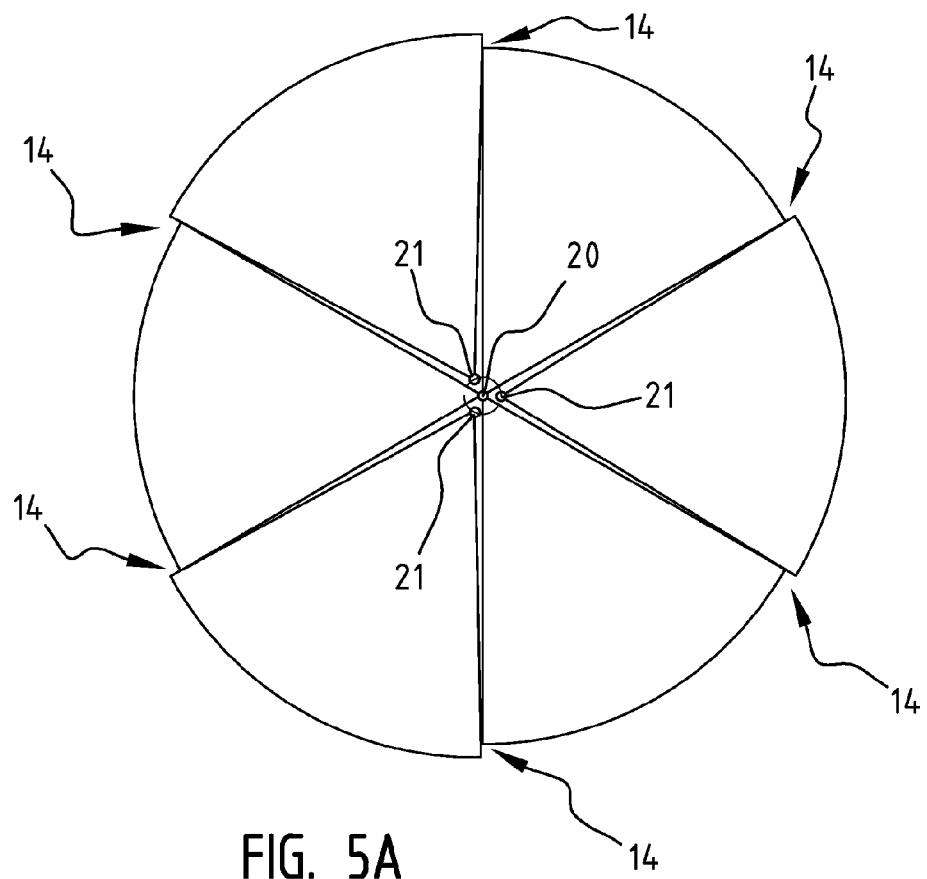
FIGS. 5A-5B illustrate the principle of overlapping field of views to facilitate the stitching process.
Figure 5B:
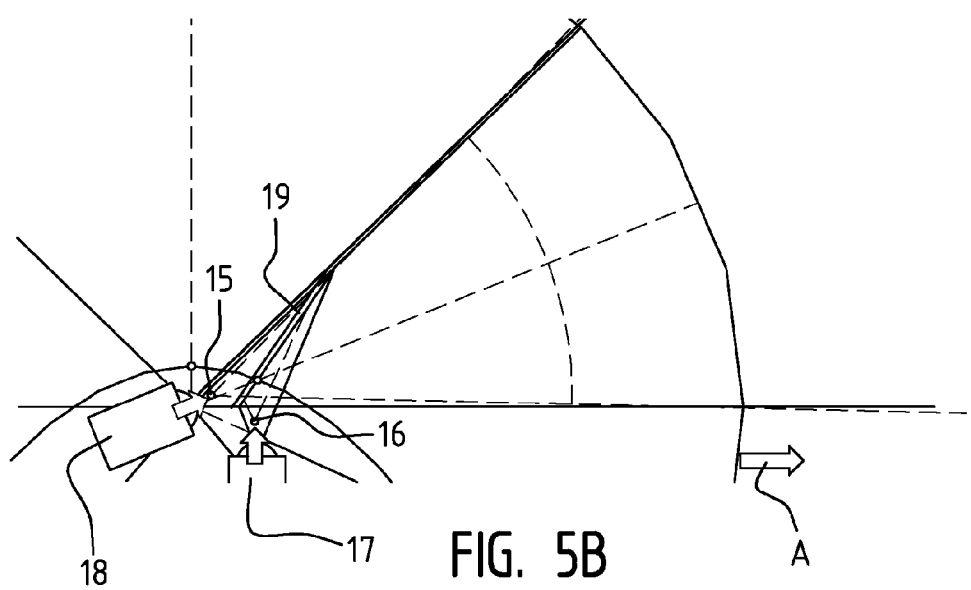

FIGS. 5A-5B illustrate the principle of overlapping field of views to facilitate the stitching process.

When stitching the partial images that are recorded by the optical cameras, distortion may occur near the edges of the light direction elements and/or parts of the frame may block incident light in particular near the region of overlap. To prevent these deteriorating effects or to reduce their effect in the final panoramic image, it is advantageous to ensure a certain overlap between neighboring FOVs. The information contained in the overlap can be used to at least reduce the impact of the distortions.

FIG. 5A illustrates, in a top view, how the overlap can be achieved. By introducing an offset between the focus points 20, 21 corresponding to neighboring FOVs, an overlap 14 occurs near the edges of the segment. Here, point 20 represents the overlapping focus points corresponding to the optical pairs with respect to the remaining three segments. This is illustrated in more detail in FIG. 5B. Here, dots 16, 15 illustrate the actual position of optical camera 17 and the corresponding virtual camera 18, respectively, with respect to the positions based on overlapping focus points coinciding with focus point 7. In this example, the position of optical mirror 19 has not changed compared to the position corresponding to overlapping focus points.

In FIG. 5B, dot 15 represents the position of the entrance pupil of virtual camera 18 which would result in the desired overlap. If required, optical camera 17 can be chosen such that it has a larger angle of view. Dot 16 corresponds to the position of the actual optical camera 17. At this position, the light that would be captured by virtual camera 18 at the position indicated by dot 15, corresponds to that captured by optical camera 17.

Although this positioning produces the desired overlap it introduces parallax errors because the partial images are not taken from the same position. To solve this problem in the specific case where the device is moving in a direction indicated by arrow A, optical camera 17 is triggered to record an image when the position of its apparent entrance pupil 15, or at least a component thereof in the direction of movement, is the same as that of the other cameras at the time of recording the image. In a system comprising a plurality of cameras, this would involve the individual triggering of each camera such that the position of the entrance pupil of the virtual camera, or at least a component thereof in the direction of movement, would be the same for each camera at the time of recording an image by that camera.

Figure 6:
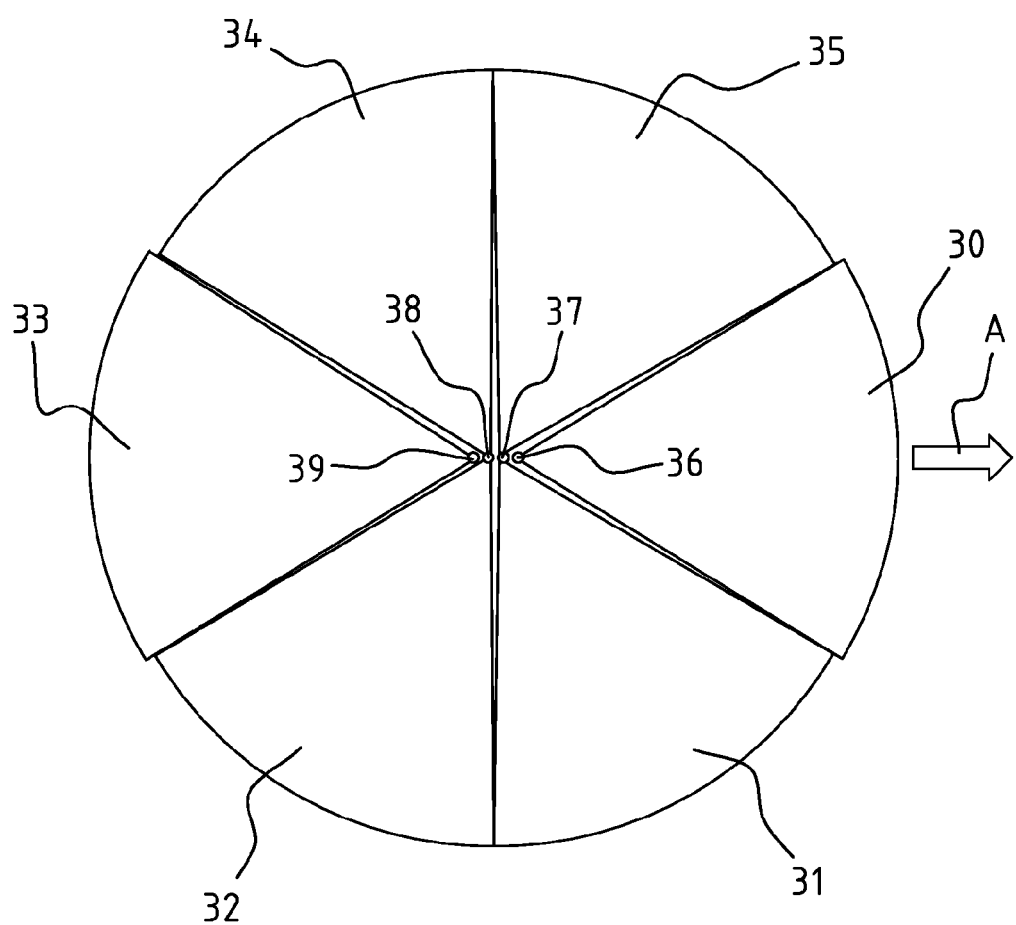
FIG. 6 illustrates a further example of overlapping field of views to facilitate the stitching process.

FIG. 6 presents a different arrangement of focus points corresponding to the respective optical pairs. Compared to FIG. 5A, it is apparent that these focus points all lie on a straight line that corresponds with a direction of movement indicated by arrow A. Here, focus points (36, 37, 38, 39) correspond respectively to field of views (30, 31+35, 32+34, 33), where "+" indicates that these field of views correspond to an identical focus point. By individually triggering the various optical cameras, such that at the time of recording an image the virtual entrance pupil of each optical camera (i.e. the corresponding focus point) is at the same position, parallax errors can be completely eliminated. This is contrary to FIG. 5B, where a small shift perpendicular to the direction of movement remains.

It should be apparent to the skilled person in the art, that various other types of offset are possible to generate the desired overlap.

The present invention is particularly well suited for applications in which the panoramic images should be metrically correct. In such systems it is important to detect deformations of the optical system such that these deformations can be corrected or accounted for. Such detecting of deformations can be made part of a calibration of the system.

Several options may be used by which the system can be calibrated. As a first option, fiducials may be placed on reflective components, such that they appear in parts of the partial image that are not used in the final panoramic image. For instance, fiducials may appear in the overlapping regions.

As a second option, fiducials may be placed on reflective components, such that they appear in parts of the partial image that are used in the final panoramic image. In this case, the fiducials could be realized with special paint that is only visible when applying special light, such as infrared light. An infrared light source, such as a light emitting diode, can be part of the system for illuminating the fiducials during calibration.

As a third option, auxiliary light sources can be placed on known positions with respect to the reflective components. By capturing the light from these auxiliary light sources using the cameras, information can be obtained about the reflective components.

It should further be apparent to the skilled person that the present invention is not limited to recording still images only. The recording of moving images, for the construction of a high-resolution panoramic movie, also falls within the scope of the invention.

Although the present invention has been described using embodiments thereof, it is not limited thereto. Various modifications to these embodiments are possible without departing from the scope of protection that is defined by the appended claims.

The invention claimed is:
1. A system for recording panoramic images, comprising:
a device for recording panoramic images, the panoramic images being formed using a plurality of partial images, the device comprising:
a frame; and
a plurality of optical pairs, each optical pair comprising a light directing element and an optical camera having an entrance pupil, wherein the light directing element of each optical pair is arranged at a point on a respective parabola, perpendicular to a tangent thereof, the respective parabola having an axis of symmetry and a focus point, the light directing element and optical camera of each optical pair being connected to the frame in such a manner that the optical camera records an image obtained via the light directing element as if it were positioned with its entrance pupil at the respective focus point;

wherein each optical pair defines a field of view (FOV) representing a segment of an environment of the device from which light can be captured via directing thereof by the light directing element onto the entrance pupil of the respective optical camera;

wherein the respective focus points of the plurality of optical pairs substantially overlap each other;

wherein the axes of symmetry of the respective parabolas of at least two optical pairs of the plurality of optical pairs are substantially parallel, and wherein the FOVs defined by the at least two optical pairs are adjacent in a direction parallel to the substantially parallel axes of symmetry;

and wherein respective focus points of optical pairs corresponding to adjacent FOVs are slightly offset relative to each other for allowing a slight overlap between the adjacent FOVs to improve stitching of the plurality of partial images into the panoramic image;

the system further comprising:

a controller to individually and independently trigger each optical camera to record a partial image;

a motion calculator to calculate a distance travelled by the system in a movement direction; and a processing unit to calculate a timing difference between optical cameras based on the relative offset of their focus points in the direction of movement;

wherein the controller is arranged to trigger the optical cameras using the calculated timing difference in a manner such that the optical cameras record partial images as if their entrance pupils were at substantially the same position in the direction of movement at the time of recording the partial image.

2. The system according to claim 1, wherein at least the device for recording panoramic images is mounted on a moveable vehicle, and wherein the respective focus points of the plurality of optical pairs are positioned along a substantially straight line that corresponds to a default direction of movement of the moveable vehicle.

3. The system according to claim 1, wherein the optical axes of the optical cameras of the at least two optical pairs are substantially parallel, and wherein the parabolas of the at least two optical pairs are substantially overlapping.

4. The system according to claim 1, wherein the axes of symmetry of the respective parabolas are substantially parallel to a common axis of symmetry, the plurality of respective parabolas substantially defining a paraboloid.

5. The system according to claim 4, wherein the device has a conical shape and is elongated in the direction of the common axis of symmetry, and wherein the plurality of optical pairs can be divided into at least two groups, each group being arranged for recording a circumferential ribbon of adjacent partial images around the common axis of symmetry at a different longitudinal position, wherein the light directing elements of each optical pair in the same group have substantially the same longitudinal position, and wherein the optical cameras of each optical pair in the same group have substantially the same longitudinal position.

6. The system according to claim 5, further comprising an optical camera arranged substantially at one of the focus points.

7. The system according to claim 5, wherein, for each optical pair, the distance between the respective focus point and the corresponding point on the parabola is equal to the distance between the corresponding point and the entrance pupil of the respective optical camera.

8. The system according to claim 5, wherein the light directing element is an optical reflective element.

9. The system according to claim 8, wherein the optical reflective element is a mirror, wherein each optical pair comprises a mirror that is part of an integrally formed curved mirror.

10. The system according to claim 9, wherein the mirrors of each group are part of a respective integrally formed curved mirror.

11. The system according to claim 1, wherein the light directing element is a refractive element.

12. The system according to claim 11, wherein the refractive element is a prism or a ray bender.

13. The system according to claim 1, wherein at least one of the light directing elements or optical cameras is realized in Micro Electro Mechanical Systems (MEMS) technology.

14. The device according to claim 1, wherein the FOVs defined by the at least two optical pairs are arranged in a stacked manner in the direction parallel to the substantially parallel axes of symmetry.

15. The device according to claim 1, wherein the FOVs defined by the at least two optical pairs overlap in the direction parallel to the substantially parallel axes of symmetry for forming an overlapping region in the form of a ribbon that extends in a circumferential direction with respect to the substantially parallel axes of symmetry.

16. A moveable vehicle equipped with a system for recording panoramic images, the system comprising:

a device for recording panoramic images, the panoramic images being formed using a plurality of partial images, the device comprising:

a frame; and a plurality of optical pairs, each optical pair comprising a light directing element and an optical camera having an entrance pupil, wherein the light directing element of each optical pair is arranged at a point on a respective parabola, perpendicular to a tangent thereof, the respective parabola having an axis of symmetry and a focus point, the light directing element and optical camera of each optical pair being connected to the frame in such a manner that the optical camera records an image obtained via the light directing element as if it were positioned with its entrance pupil at the respective focus point;

wherein each optical pair defines a field of view (FOV) representing a segment of an environment of the device from which light can be captured via directing thereof by the light directing element onto the entrance pupil of the respective optical camera;

wherein the respective focus points of the plurality of optical pairs substantially overlap each other;

wherein the axes of symmetry of the respective parabolas of at least two optical pairs of the plurality of optical pairs are substantially parallel, and wherein the FOVs defined by the at least two optical pairs are adjacent in a direction parallel to the substantially parallel axes of symmetry;

and wherein respective focus points of optical pairs corresponding to adjacent FOVs are slightly offset relative to each other for allowing a slight overlap between the adjacent FOVs to improve stitching of the plurality of partial images into the panoramic image;

the system further comprising:

a controller to individually and independently trigger each optical camera to record a partial image;

a motion calculator to calculate a distance travelled by the moveable vehicle in a movement direction; and a processing unit to calculate a timing difference between optical cameras based on the relative offset of their focus points in the direction of movement;

wherein the controller is arranged to trigger the optical cameras using the calculated timing difference in a manner such that the optical cameras record partial images as if their entrance pupils were at substantially the same position in the direction of movement at the time of recording the partial image.

17. The moveable vehicle of claim 16, wherein the moveable vehicle is a motorized vehicle.

18. The moveable vehicle of claim 17, wherein the moveable vehicle is a car.

19. A device for recording panoramic images, the panoramic images being formed using a plurality of partial images, the device comprising:

a frame; and a plurality of optical pairs, each optical pair comprising a light directing element and an optical camera having an entrance pupil, wherein the light directing element of each optical pair is arranged at a point on a respective parabola, perpendicular to a tangent thereof, the respective parabola having an axis of symmetry and a focus point, the light directing element and optical camera of each optical pair being connected to the frame in such a manner that the optical camera records an image obtained via the light directing element as if it were positioned with its entrance pupil at the respective focus point;

wherein each optical pair defines a field of view (FOV) representing a segment of an environment of the device from which light can be captured via directing thereof by the light directing element onto the entrance pupil of the respective optical camera;

wherein the respective focus points of the plurality of optical pairs substantially overlap each other;

wherein the axes of symmetry of the respective parabolas of at least two optical pairs of the plurality of optical pairs are substantially parallel, and wherein the FOVs defined by the at least two optical pairs are adjacent in a direction parallel to the substantially parallel axes of symmetry;

wherein respective focus points of optical pairs corresponding to adjacent FOVs are slightly offset relative to each other for allowing a slight overlap between the adjacent FOVs to improve stitching of the plurality of partial images into the panoramic image;

and wherein the system is configured to be mounted on a moveable vehicle, wherein the respective focus points of the plurality of optical pairs are positioned along a substantially straight line that corresponds to a default direction of movement of the moveable vehicle.

* * * * *